US007926447B2

(12) United States Patent
Flannery

(10) Patent No.: US 7,926,447 B2
(45) Date of Patent: Apr. 19, 2011

(54) PET BED

(75) Inventor: Mark A. Flannery, Longboat Key, FL (US)

(73) Assignee: Carlson Pet Products, Inc., Longboat Key, FL (US)

( * ) Notice: Subject to any disclaimer, the term of this patent is extended or adjusted under 35 U.S.C. 154(b) by 0 days.

(21) Appl. No.: 11/606,489

(22) Filed: Nov. 30, 2006

(65) Prior Publication Data

US 2008/0127897 A1 Jun. 5, 2008

(51) Int. Cl.
*A01K 29/00* (2006.01)
(52) U.S. Cl. ....................................... 119/28.5
(58) Field of Classification Search ............... 119/28.5; 297/158.4
See application file for complete search history.

(56) References Cited

U.S. PATENT DOCUMENTS

| | | | |
|---|---|---|---|
| 870,058 A | 11/1907 | Sparmaker | |
| 998,761 A | 7/1911 | Engstrand | |
| 3,049,724 A * | 8/1962 | Goodman | 5/35 |
| 3,169,544 A * | 2/1965 | Brown | 135/154 |
| 3,565,040 A * | 2/1971 | Pohl | 119/28.5 |
| 3,693,641 A * | 9/1972 | Moss | 135/127 |
| 5,072,694 A * | 12/1991 | Haynes et al. | 119/482 |
| 5,146,634 A * | 9/1992 | Hunt | 5/486 |
| 5,197,411 A * | 3/1993 | Schwarzenbart | 119/28.5 |
| 6,122,781 A * | 9/2000 | Stephenson | 5/482 |
| 6,564,402 B1 | 5/2003 | Lin | |
| 6,591,778 B1 * | 7/2003 | Alderman | 119/28.5 |
| 2006/0219181 A1* | 10/2006 | Pape et al. | 119/28.5 |
| 2008/0127413 A1 | 6/2008 | Flannery | |

* cited by examiner

*Primary Examiner* — Timothy D Collins
*Assistant Examiner* — Valentina Xavier

(57) ABSTRACT

A bed for a pet such as a cat or dog that includes a frame having a collapsible and expandable network of interlocking legs and a covering for the frame. The covering includes a first cover portion for extending over a top and four sides of the frame, and a second cover portion for further extending over the top side or raised floor of the frame. The network of interlocking legs includes pairs of pivoting legs interconnected via hubs and, as a whole, is resilient so as to provide a forgiving or hammock style of pet bed. The first cover portion hides the networked frame from view. The second cover portion includes a cushion to provide further resiliency to the pet bed and further includes a carpet of soft fibers on which the pet directly makes contact when lying down.

11 Claims, 5 Drawing Sheets

PET BED

FIELD OF THE INVENTION

The present invention relates generally to a pet bed, particularly to a pet bed having a frame of interconnected legs that can be collapsed and expanded, and specifically to such a pet bed that further includes a covering for the top and four sides of the frame.

BACKGROUND OF THE INVENTION

Dogs love beds. Beds are soft, resilient and warm. Moreover, dogs are social animals and prefer to be as close as possible to one or more family members. Even if vacant, beds contain the scent of a family member, perhaps providing security for the dog home alone.

Of course, some dog owners prefer the dog out of the bed. In such a case, the dog may be provided with a blanket at some location in the house, such as adjacent a heating vent. Or the dog may sleep on his or her own pet bed, such as an overstuffed bean bag type of bed. Sometimes the dog gets the couch at night.

A blanket is portable. A blanket may provide a level of security for a dog. However, a blanket provides little cushion and no resiliency.

A couch provides cushion and resiliency. Yet a couch is typically not portable. Couches too, like beds, are often off limits for the family dog.

A kennel, especially for a larger dog, may be relatively large for being used inside of the house and is minimally portable. Also, the conventional kennel has just one port of access. This cave like feature may provide a level of security for some dogs. However, delegation to such a closed chamber may be taken as punishment by other dogs.

The bean bag type dog bed is portable and provides some cushion for the dog. However, a bean bag type dog bed is not resilient. Further, a bean bag type dog bed tends to be relatively large for even a relatively small dog and thus takes up a relatively great amount of space. Also, a bean bag type dog seat always occupies the same amount of space; it is not collapsible and thus is not stored easily.

SUMMARY OF THE INVENTION

A feature of the present invention is a pet bed that is collapsible from an open configuration to a closed configuration and expandable from the closed configuration to the open configuration.

Another feature of the present invention is the provision in a pet bed that is collapsible from an open configuration to a closed configuration and expandable from the closed configuration to the open configuration, of at least four first hubs and at least four second hubs, with the first hubs lying generally in a first plane in each of the open and closed configurations, and with the second hubs lying generally in a second plane in each of the open and closed configurations, with the first hubs confronting each other when the pet bed is in the closed position, with the second hubs confronting each other when the pet bed is in the closed position, and with each of the first hubs being paired with and confronting one of the second hubs when the pet bed is in the open position.

Another feature of the present invention is the provision in a pet bed that is collapsible from an open configuration to a closed configuration and expandable from the closed configuration to the open configuration, of at least eight interlocking legs, with each of the interlocking legs having a first end section, a midsection and a second end section, with each of the interlocking legs being pivotally joined to another interlocking leg at the midsection via a first pivot, with each of the first end sections of the interlocking legs being pivotally joined to one of the first hubs, and with each of the second end sections of the interlocking legs being pivotally joined to one of the second hubs such that the frame is collapsible from an open configuration to a closed configuration and expandable from the closed configuration to the open configuration.

Another feature of the present invention is the provision in a pet bed that is collapsible from an open configuration to a closed configuration and expandable from the closed configuration to the open configuration, of a first brace or stop extending between a first pair of interlocking legs that are pivotally joined to each other such that a further opening of the frame of the pet bed is stopped.

Another feature of the present invention is the provision in a pet bed that is collapsible from an open configuration to a closed configuration and expandable from the closed configuration to the open configuration, of a covering engaged to the frame and capable of receiving and supporting a pet standing, sitting or lying down, with the covering being flexible such that the covering is collapsible from an open configuration to a closed configuration and expandable from the closed configuration to the open configuration.

Another feature of the present invention is the provision in a pet bed that is collapsible from an open configuration to a closed configuration and expandable from the closed configuration to the open configuration, of the covering including a first cover portion, with the first cover portion providing a raised floor portion and further being disposed over the interlocking legs to generally hide the frame from view.

Another feature of the present invention is the provision in a pet bed that is collapsible from an open configuration to a closed configuration and expandable from the closed configuration to the open configuration, of the covering including a second cover portion, with the second cover portion being releasably engaged to at least one of the hubs and first cover portion, and with the second cover portion including a resilient cushion tracking the four sides of the frame to provide a nest like feature to the pet bed.

Another feature of the present invention is the provision in a pet bed that is collapsible from an open configuration to a closed configuration and expandable from the closed configuration to the open configuration, of the second cover portion including a soft fiber layer, with the soft fiber layer extending generally from the first side to the second and opposite side and from the third side to the fourth and opposite side, and with the soft fiber layer being exposed such that a pet on the pet bed makes direct contact with the soft fiber layer.

An advantage of the present invention is a pet bed that can be collapsed to a compact form for storage and is thus portable. One feature contributing to this advantage is the network of legs that pivot at midsections and that pivot at corner hubs.

Another advantage of the present invention is a pet bed that, despite being collapsible and expandable, is relatively sturdy and supportive for even a large dog such as a Chocolate Labrador. One feature contributing to this advantage is the stop or brace that stops the network from further expansion and supports the network while the network is in an open configuration. A pair of first stops is disposed on one side of the frame and a pair of second stops is disposed on the opposite side of the frame.

Another advantage of the present invention is a pet bed that is resilient. Features contributing to such resiliency are the frame and free standing hubs, and the covering that pulls in a hammock fashion from the free standing hubs. With connection at four corner hubs, the covering does not spin like a hammock but provides the resiliency of a hammock.

Another advantage of the present invention is a pet bad that provides a nest in at least two different ways. First, the hammock style arrangement provides a depression in the nature of a nest. Second, the resilient cushion tracks the first, second, third and fourth sides of the frame to extend about a periphery of the top of the covering such that the central portion of the covering is lower than such periphery.

Another advantage of the present invention is that it is inexpensive to manufacture.

Another advantage of the present invention is that the pet bed is open. That is, a pet may step onto the pet bed from any direction, from any of the four sides of the pet bed, or from any of the corners of the pet bed.

Another advantage of the present invention is that the raised floor of the covering is spaced from the surface on which the pet bed rests, such as a floor of a house or a lawn. A floor may be cold or warm. Whether the floor is cold or warm, the pet bed may be placed next to a vent that may dispense warm air in the winter or cool air in the summer, and such air may then be circulated over and under the pet and pet bed. Even if not adjacent a vent, the raised floor of the pet bed takes on the temperature of the surrounding air, not the temperature of the cold cement floor of the garage or basement, or the temperature of the cold tile floor of the kitchen or basement, or the temperature of the cold hardwood floor of the living room or bedroom.

DESCRIPTION

Figure 1A:
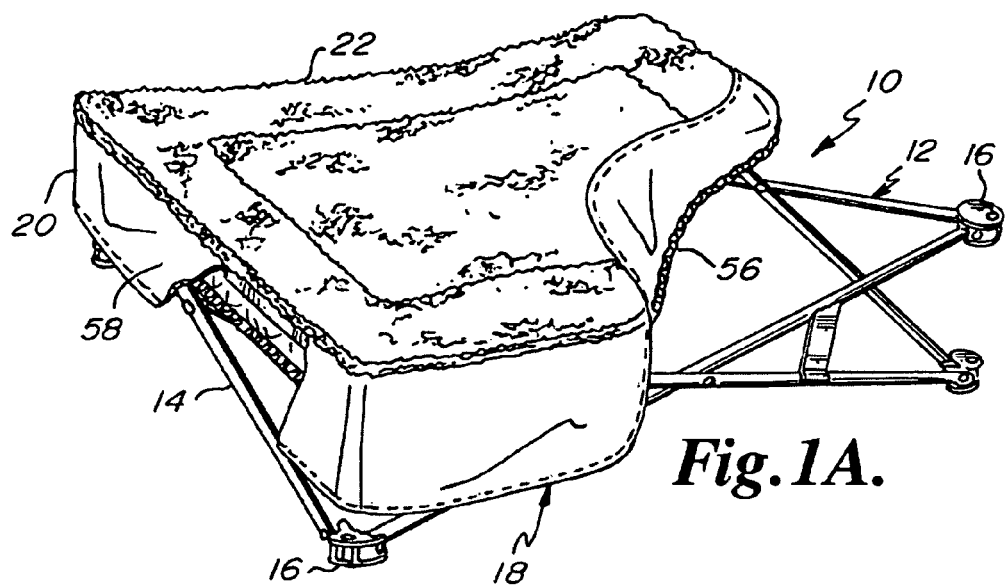
FIG. 1A is a perspective view of the preferred embodiment of the present pet bed in an open and operating configuration.
Figure 1B:
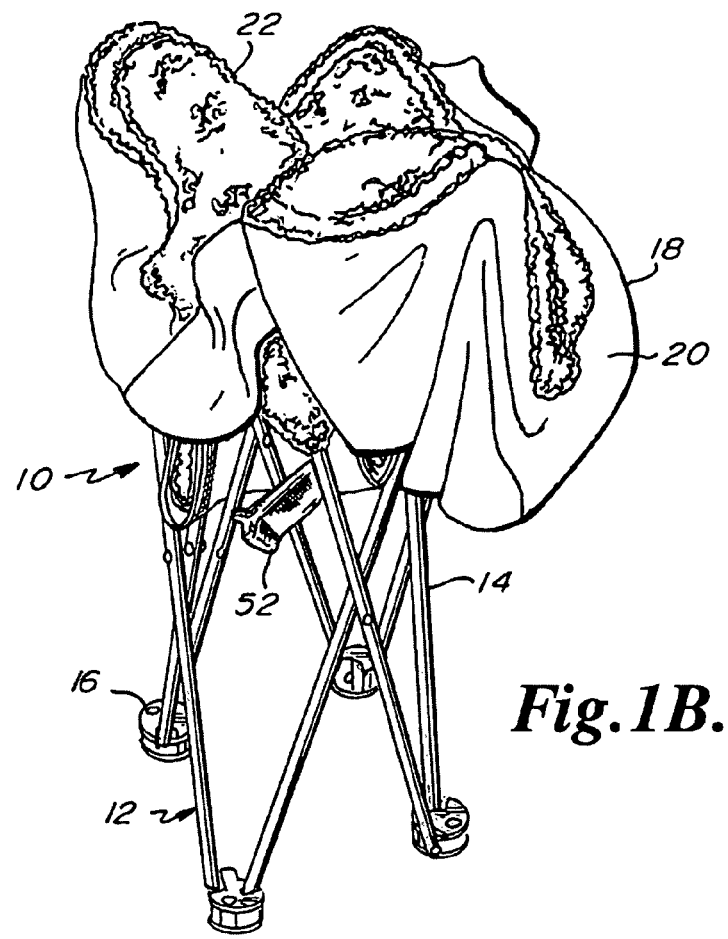
FIG. 1B is a perspective view of the pet bed of FIG. 1 in a collapsed configuration.

As shown in FIGS. 1A and 1B, the preferred embodiment of the pet bed is indicated in general by the reference numeral 10. Pet bed 10 includes a network or frame 12 of interconnected legs 14 and hubs 16. Pet bed 10 further includes a covering 18 having a first cover portion 20 and a second cover portion 22 disposed on top of the first cover portion 20 such that the top of the pet bed 10 includes two cover layers.

Figure 4:
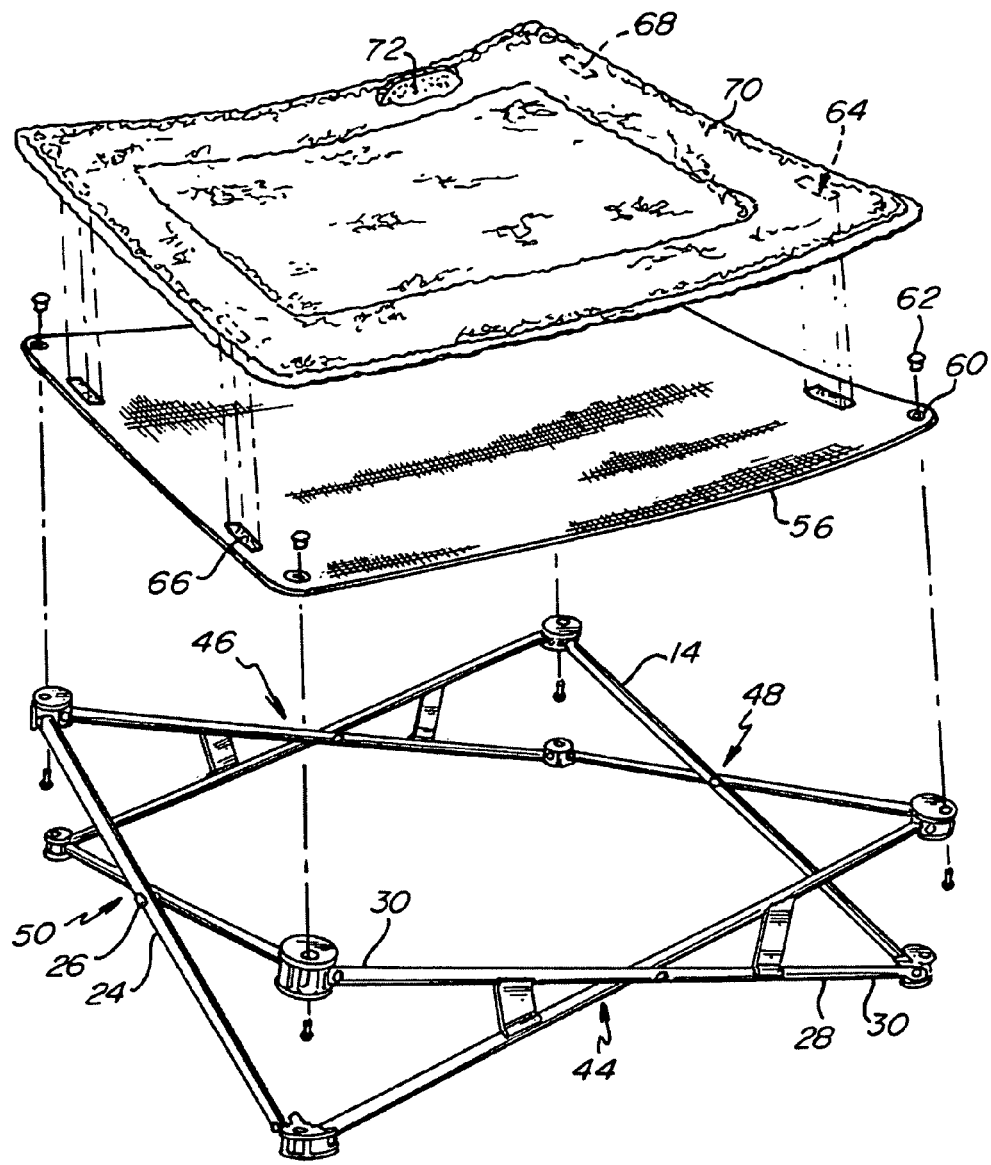
FIG. 4 is an exploded perspective view of the pet bed of FIG. 3A and shows how the first cover portion is engaged to the frame and how the second cover portion is engaged to the first cover portion.
Figure 5B:
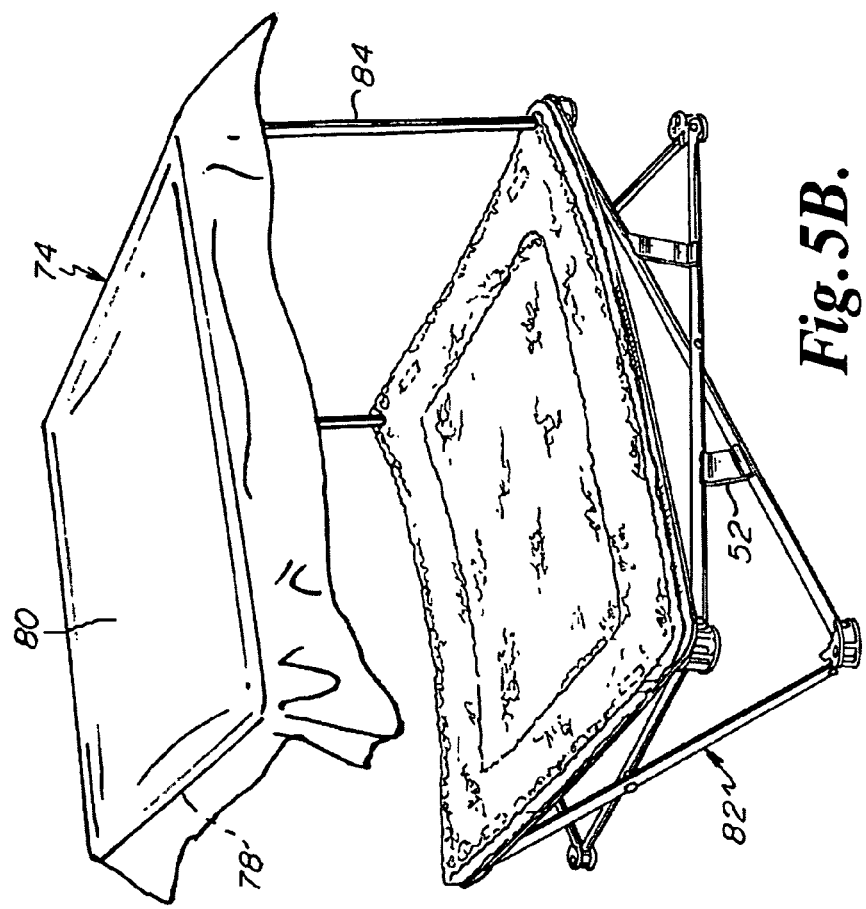
FIG. 5B is a perspective view of the pet bed of FIG. 3A having a canopy.
Figure 5A:
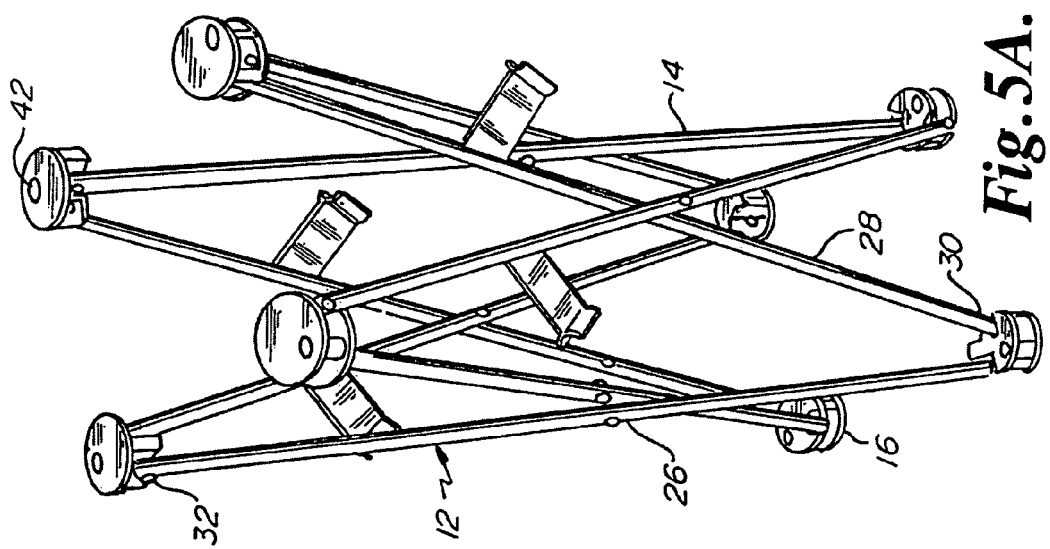
FIG. 5A is a perspective view of the frame of the pet bed of either FIG. 1A or FIG. 3A.

FIGS. 4 and 5A shows the frame 12 free of the covering 18. FIG. 4 shows the frame 12 in an open configuration. FIG. 5A shows the frame 12 in a configuration that is approaching and close to the closed configuration.

As shown in FIGS. 4 and 5A, leg 14 includes a midsection 24 where a pivot 26 pivotally joins such midsection 24 to a midsection of a paired leg 14. Leg 14 further includes a half-section 28 and a pair of end sections 30. Leg half-section 28 extends from one of the end sections 30 to the midsection 24 where the pivot 26 is located. Each of the end sections 30 is pivotally jointed via a pivot 32 to one of the hubs 16. Leg 14 is preferably, tubular. Leg 14 is preferably formed of a metal such as steel or aluminum. Leg 14 is preferably relatively rigid yet somewhat resilient.

Figure 2A:
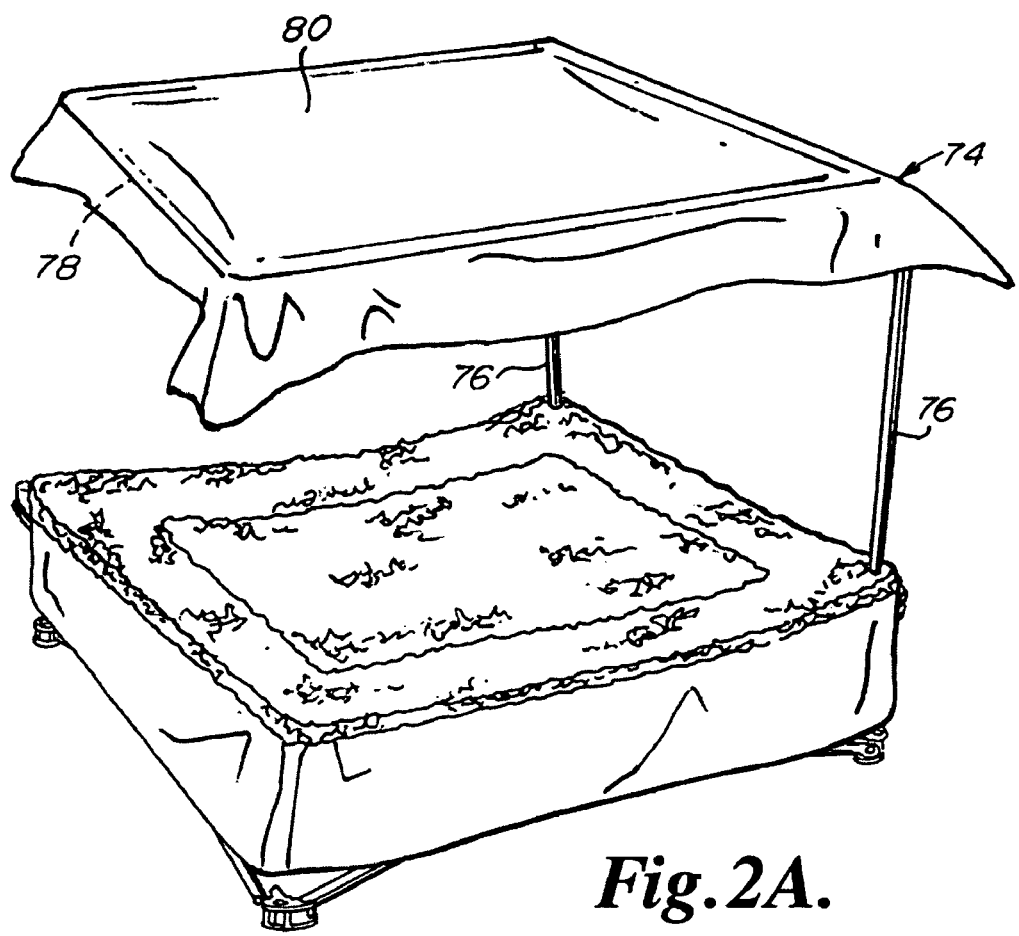
FIG. 2A is a perspective view of the pet bed of FIG. 1 having a canopy.
Figure 2B:
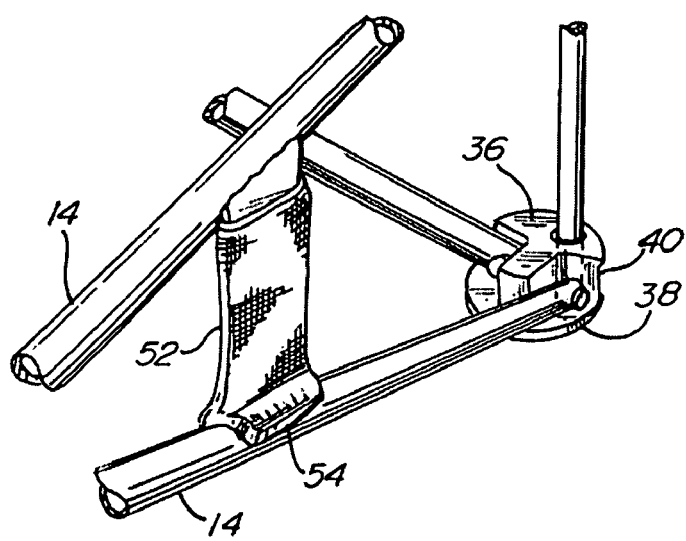
FIG. 2B is a detail perspective view of a portion of the frame of the pet bed of FIG. 1 and shows a stop that prevents the frame from further expansion.
Figure 3A:
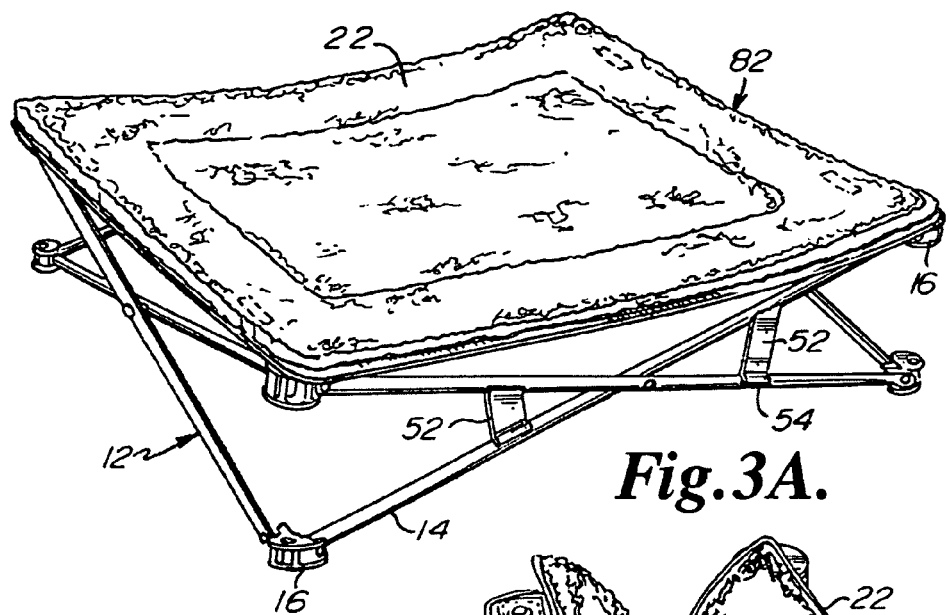
FIG. 3A is a perspective view of an alternate embodiment of the present pet bed in an open and operating configuration.
Figure 3B:
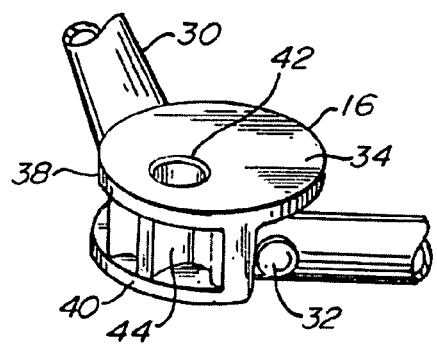
FIG. 3B is a detail perspective view of a hub that may be utilized for any of the hubs of the pet bed of FIG. 1A or 3A.

Hub 16 is shown in detail in FIGS. 2B and 3B. Hub 16 includes a circular or disk shaped flat face 34. Flat face 34 is turned upwardly when hub 16 is one of the upper four hubs of the frame 12. Here such a flat face 34 minimizes any discomfort to any portion of the body of a pet that may be lying on a corner of the pet bed 10. Flat face 34 is turned downwardly when flat face 34 is one of the lower four hubs of the frame 12. Here such a flat face 34 maximizes the stability of the pet bed 10 and serves as a flat foot for the pet bed 10. Flat face 34 is opposed by a T-shaped flat face 38, as shown in FIG. 2B. Flat face 34 resides on a disk portion 38 of hub 16. Flat face 36 resides on a T-shaped portion 40 of hub 16, and such T-shaped portion 40 of hub 16 extends for a great amount of the height of the hub 16. T-shaped portion 40 includes a first wall that serves as a base for engaging one pivot 32 that in turn engages one leg 14 of a particular hub 16. T-shaped portion 40 includes a second wall that serves as a base for engaging another pivot 32 that in turn engages the other leg 14 joined to such hub 16. Such two pivots 32 of a particular hub 16 are disposed on respective axes set perpendicular to each other. Such two pivots 32 are connected within hub 16, not on an exterior of hub 16. Such a recession of the pivots 32 and the protection of the relatively wide disk shaped portion 38 minimize a pinching of fingers when the frame 12 is expanded and collapsed. Hub 16 further includes a through opening 42 that extends to and between the faces 34 and 36. Hub 16 further includes support ribs extending between the disk portion 38 and the T-shaped portion 40.

As shown in FIG. 4, frame 12 includes a first side 44 opposite a second side 46. Frame 12 further includes a third side 48 opposite a fourth side 50. Each of the sides 44, 46, 48 and 50 is formed by a pair of interconnected legs 14. Each of the interconnected legs 14 is pivotally joined to an upper hub, to a lower hub, and to one other leg 14. The path of travel from leg 14 to leg 14 or, more specifically, from the distal end of a first leg 14, across a first hub 16, to the proximal end of a second leg 14 engaged to the first hub 16, to the distal end of the second leg 14, across a second hub 16, to the proximal end of a third leg 14 is as follows: from an upper first hub, a first leg 14 extends outwardly of a leg to which it is pivotally joined to a lower second hub, a second leg 14 then extends from the lower second hub and inwardly of a leg to which it is pivotally joined to an upper third hub, a third leg 14 then extends from the upper third hub and outwardly of a leg to which it is pivotally joined to a lower fourth hub, and a fourth leg 14 then extends from the lower fourth hub and inwardly of a leg to which it is pivotally joined to the first hub. A second set of four legs 14 is provided with the same path of travel as the first set of legs 14 except that the second set of four legs 14 is offset by the distance of one-half of a leg 14.

The pet bed 10 includes at least four first and upper hubs 16 and at least four second and lower hubs 16. The first hubs 16 lie generally in a first plane in each of the open and closed configurations. The second hubs 16 lie generally in a second plane in each of the open and closed configurations. The first hubs 16 confront each other when the pet bed 10 is in the closed position. The second hubs 16 confront each other when the pet bed 10 is in the closed position. Each of the first hubs 16 is paired with and confront one of the second hubs 16 when the pet bed 10 is in the open position. Each of said second hubs 16 includes a face for confronting a surface on which the pet bed rests.

As shown in detail in FIG. 2B, frame 12 includes a stop or brace 52 that prevents further expansion of frame 12 so as to maintain frame 12 in a position operable to provide support for covering 18. Stop 52 includes a cradle 54 to confront and make contact with a leg 14. Cradle 54 is elongate in the direction of the axis of the leg 14 with which it engages. Stop 52 is in the shape of a thin bar or sheet. As shown in FIG. 2B, stop 52 is rigidly fixed to one leg 14 and releasably engages the paired pivoting leg 14. Stop 52, or its axis, extends obliquely downwardly from the leg 14 to which it is rigidly affixed and meets up with the other leg 14 at generally a perpendicular angle. Stop 52 depends from an outward or inner portion of the leg 14 to which it is rigidly affixed and then bends inwardly or outwardly such that a lower portion of stop 52 is aligned in generally a common vertical plane with the leg 14 that it releasably engages.

As indicated above, covering 18 includes a first cover portion 20 and a second cover portion 22. First cover portion 20 generally includes a top cover section 56 engaged, such as by stitching, to a side cover section 58. Top cover section 56 when utilized alone without side cover section 58 is shown in the exploded view in FIG. 4 of an alternate embodiment of the invention.

As shown in FIG. 1A, side cover section 58 covers each of the first, second, third and fourth sides 44, 46, 48 and 50 from a first horizontal plane defined by the four upper hubs to generally a second horizontal plane defined by a location at or slightly above the four lower hubs. When a pet is in the pet bed, the lower edge of the side cover section 58 may terminate slightly above a horizontal plane defined by the four lower hubs because of an upward pulling of the side cover section 58 caused by the weight of the pet. When a pet is not in the pet bed, the lower edge of the side cover section 58 may terminate at a location in a horizontal plane defined by about a medial portion of the four lower hubs. The side cover section 58 is preferably formed of an opaque material to hide the frame 12. The side cover section 58 may be formed of a relatively lightweight nylon material.

The first cover portion 20 further includes the top cover section 56. As shown in FIG. 4, the top cover section 56 includes a grommet or reinforced through opening 60 in each of the four corners of the top cover section 56. A pin connector 62 inserted through grommet 60 and hub 16 via hub opening 42 engages the top cover section 56 and hence the first covering 18 to the frame 12. Pin connector 62 can be formed in two parts where one part is a keyed cap that engages a slotted hub opening 42 and wherein the other part is a threaded pin that screws into the keyed cap, and such two parts are shown in FIG. 4. Top cover section 56 is preferably formed of a material of greater strength and durability than side cover section 58. For example, top cover section 56 can be formed of a relatively heavy weight nylon or canvas material.

The second cover portion 22 lies on top of the top cover section 56 and engages the top cover section 56 via a quick connect 64, which quick connect 64 is shown in FIG. 4 with the alternate embodiment. Quick connect 64 includes a hook and loop connector, such as Velcro®, where a first length of material 66 includes a plurality of hooks and where a second length of material 68 includes a plurality of loops. Hook material 66 is stitched to the upper face of top cover section 56 and loop material 68 is stitched to the lower face of second cover portion 22. With the quick connect 64, top cover portion 22 can be easily removed and washed.

Top cover portion 22 includes a carpet or carpet like material 70 that includes a plurality of soft fibers. A pet lying on the pet bed 10 makes direct contact with such soft fibers. The carpet and soft fibers extend from the first side 44 to the second and opposite side 46 and from the third side 48 to the fourth and opposite side 50.

Top cover portion 22 further includes a generally square border of cushioned material 72, such as open or closed cell foam, sandwiched between a base and the soft fiber upper layer of the top cover portion 22. The border of cushioned material 72 minimizes any hardness of the frame 12 that may be felt through the covering 18. The border of cushioned material 72 further lends to the creation of a nest for the pet, which nest is further created by the weight of the pet pulling down on the hammock style covering 18 and forming a depression within the four sides 44, 46, 48 and 50 of the frame 12, without such a depression making contact with the surface on which the pet bed 10 rests, such that the depression is above a horizontal plane defined by the four lower hubs 16.

FIG. 2A shows that pet bed 10 may further include a canopy 74 for shade such as when the pet bed 10 is used outside. Canopy 74 includes a pair of vertical supports 76 engaged to frame 12, such as by each of the vertical supports 76 being inserted through hub opening 42 of an upper hub 16 and then into hub opening 42 of the aligned lower hub 16. The vertical supports 76 in turn are engaged to and support a generally square canopy frame 78, which in turn supports canopy sheeting 80 engaged to and over canopy from 78.

FIG. 3A shows an alternate embodiment of the invention, namely a pet bed 82. Pet bed 82 is identical to pet bed 10 except that pet bed 82 does not include the side cover sheeting 58 that hides the frame 12 from view.

FIG. 5B shows pet bed 82 having canopy 74, canopy frame 78 and canopy sheeting 80, except that canopy 74 includes vertical support members 84 that engage only the upper hubs 16.

Figure 3C:
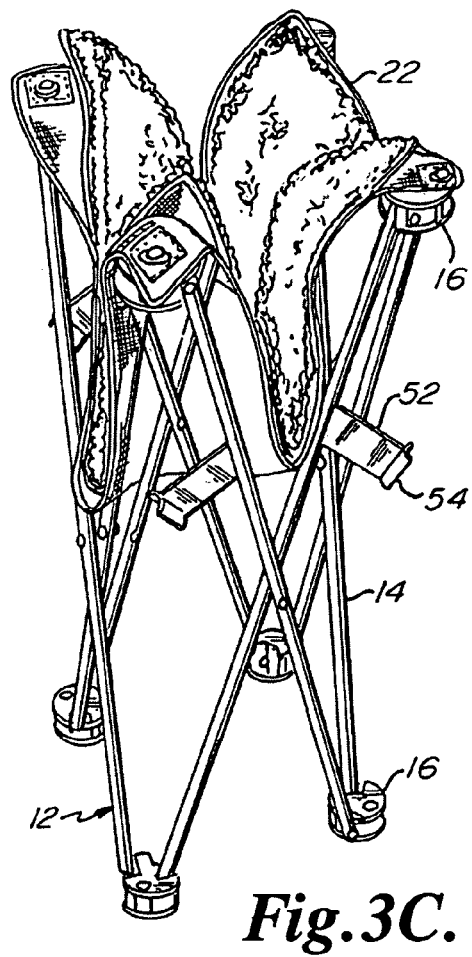
FIG. 3C is a perspective view of the pet bed of FIG. 3A in a collapsed configuration.

Pet bed 10 or 82 may be stored in the configuration as shown in FIGS. 1B and 3C. Such a stored configuration may be even more compact such that the lower hubs 16 may be drawn even closer to each other and such that the upper hubs 16 may be drawn even closer to each other. In the stored configuration, pet bed 10 or 82 may reside in a storage bag, or on its side, or with a band placed therearound, or in a closet or other confined space such that the lower hubs 16 do not slide apart. Such prevents the frame 12 from spreading out and assuming an open position.

In operation, the pet bed 10 or 82 is placed on a surface with the lower hubs 16 making contact with such surface. When such a surface is a hardwood or tiled floor, the lower hubs 16 automatically slide apart such that the pet bed 10 or 82 automatically assumes the open position under the weight of gravity and under the weight of the covering 18. When such a surface is cement or an undulating carpet or rug, the frame 12 spreads out automatically or with the aid of slight pressure, such as slight hand pressure, upon one of the upper hubs 16. With the weight of the frame 12 alone, or with the weight of the dog in the pet bed 10 or 82, the frame 12 is prevented from expanding by the cradles 54 engaging their respective legs 14. When the cradles 54 are so engaged, the pet bed 10 or 82 is in the fully open configuration. As the pet bed 10 assumes the open position, the side cover section 58 naturally falls by gravity to hide a great portion of the frame 12 from view.

When the pet bed 10 or 82 is in the open position, a pet such as a dog can climb up and onto the covering 18 and stand or sit or lie down on the second cover portion 22. When standing or sitting or lying down, the covering 18 assumes a hammock or nest configuration where a central portion of the covering 18 is depressed and where the covering 18 adjacent the upper hubs 16 is relatively high. In such a nest configuration, the top cover section 56 pulls on the four pin connectors 62 much like the manner the connected ends of a hammock pulls on the two trees or two posts from which the hammock hangs. Such a pull is a resilient pull with such resiliency being provided by one or more of the frame 12 and covering 18. Supplementing the nest configuration is the square border of cushioned material 72, to provide even more of a nest for the curled up dog. When the pet bed 10 or 82 is occupied, even under the weight of a relatively large dog, the central portion of the covering 18 that bears the weight of the dog, is spaced from the surface confronted by the lower hubs 16. Just like walking onto the covering 18, the pet can walk off the covering 18.

Then, to store the pet bed 10 or 82, the frame 12 can be collapsed by lifting up the upper hubs 16 by hand. Then the pet bed 10 or 82 can be set on its side, or placed in a bag, or wrapped with a tie or band, or set in a confined place in the upright position such that the lower hubs 16 cannot spread automatically apart.

As shown in FIG. 3B and as described above, one of said faces, namely flat face 34, of first hub 16 is turned upwardly and is flat to maximize comfort for a pet on the platform. As shown in FIG. 4, the top cover section 56 having said four corners and the grommet 60 in each of the four corners is on top of the first hub 16 having the face 34 that is turned upwardly and is flat. As shown in FIG. 4, the top cover portion 22 having the resilient cushion 72 tracking the first, second, third and fourth sides of the frame 12 is on top of the grommet 60. As shown in FIG. 4, the top cover portion 22 having the resilient cushion 72 tracking the first, second, third and fourth sides of the frame 12 is on top of the pin connectors 62 extending through the grommets 60.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

I claim:

1. A pet bed collapsible from an open configuration to a closed configuration and expandable from said closed configuration to said open configuration, with said pet bed comprising:
   a) a frame comprising:
      i) at least four first hubs and at least four second hubs, with said first hubs lying generally in a first plane in each of the open and closed configurations, and with said second hubs lying generally in a second plane in each of the open and closed configurations, with said first hubs confronting each other when the pet bed is in the closed position, with said second hubs confronting each other when the pet bed is in the closed position, with each of the first hubs being paired with and confronting one of the second hubs when the pet bed is in the open position, with each of said second hubs having a face for confronting a surface on which the pet bed rests, with each of said first hubs having a pair of faces and a through opening extending to and between said pair of faces;
      ii) at least eight interlocking legs, with each of the interlocking legs having a first end section, a midsection and a second end section, with each of the interlocking legs being pivotally joined to another interlocking leg at said midsection via a first pivot, with each of the first end sections of said interlocking legs being pivotally joined to one of said first hubs, and with each of the second end sections of said interlocking legs being pivotally joined to one of said second hubs such that the frame is collapsible from an open configuration to a closed configuration and expandable from said closed configuration to said open configuration;
      iii) with said frame including first and second sides, with said first and second sides being opposite to each other;
      iv) with said frame including third and fourth sides, with said third and fourth sides being opposite to each other;
      v) with each of the sides of the frame including a pair of interlocking legs; and
      vi) a first stop extending between a first pair of interlocking legs that are pivotally joined to each other such that a further opening of the frame is prevented;
   b) a covering engaged to said first hubs and capable of receiving and supporting a pet standing, sitting or lying down, with said covering being flexible such that the covering is collapsible from an open configuration to a closed configuration and expandable from said closed configuration to said open configuration, wherein said covering comprises:
      i) a top cover portion, with said top cover portion comprising a carpet where said carpet extends from said first side of the frame to said second and opposite side of the frame and from said third side of the frame to said fourth and opposite side of the frame, with said top cover portion comprising a base and a soft fiber upper layer, with said soft fiber upper layer being exposed such that a pet on said pet bed makes direct contact with said soft fiber upper layer, with said top cover portion further comprising a resilient cushion comprising foam, with said resilient cushion extending about and tracking the first, second, third and fourth sides of the frame such that said resilient cushion forms a square border, such that the resilient cushion extends about a periphery of the top cover portion, and such that a central portion of the top cover portion is lower than said square border and periphery to form a nest, and with said resilient cushion being sandwiched between said base and said soft fiber upper layer;
      ii) a top cover section having four corners and a grommet in each of said four corners, with said top cover portion being on top of the top cover section;
      iii) a set of four pin connectors engaging said top cover section to said first hubs, with each of the pin connectors extending through one of said grommets and into one of said through openings of said first hubs to engage each of the four corners of the top cover section to one of said first hubs; and
      iv) quick connect material between said top cover portion and said top cover section to engage said top cover portion to said top cover section such that said top cover portion can be easily removed and washed; and c) wherein one of said faces of said first hub is turned upwardly and is flat to maximize comfort for a pet on the platform, with said top cover section having said four corners and said grommet in each of said four corners being on top of said first hub having said face that is turned upwardly and is flat, with said top cover portion having said resilient cushion tracking the first, second, third and fourth sides of the frame being on top of said grommet, and with said top cover portion having said resilient cushion tracking the first, second, third and fourth sides of the frame being on top of said pin connectors extending through said grommets.

2. The pet bed of claim 1, wherein said covering further comprises side sections, with said side sections depending from said first hubs toward said second hubs and over said pivots when the pet bed is in the open position to generally cover said interlocking legs and to generally hide said frame from view.

3. The pet bed of claim 1, wherein said covering further comprises side sections, with said side sections depending from said first plane of said first hubs to said second plane of said second hubs and over said pivots when the pet bed is in the open position to generally cover said interlocking legs and to generally hide said frame from view.

4. The pet bed of claim 1, wherein each of said interlocking legs includes a half-section disposed between one of the end sections and the midsection, with said first stop extending between half-sections of said first pair of interlocking legs.

5. The pet bed of claim 1, wherein said first stop includes an axis disposed obliquely of one of the legs of said first pair of interlocking legs.

6. The pet bed of claim 1, wherein said first stop includes an axis disposed generally perpendicular to one of the legs of said first pair of interlocking legs.

7. The pet bed of claim 1, wherein said stop is fixed to one of the legs of said first pair of interlocking legs.

8. The pet bed of claim 1, wherein said stop includes a cradle for releasably receiving one of the legs of said first pair of interlocking legs.

9. The pet bed of claim 1, and further comprising a second stop, with said second stop extending between half-sections of said first pair of interlocking legs, and with said first pivot being between said first and second stops.

10. The pet bed of claim 1, wherein said second side of the frame includes a second pair of interlocking legs having a second stop.

11. The pet bed of claim 1, wherein said face of said second hub is flat to maximize the stability of said pet bed.

* * * * *